United States Patent Office 3,605,933
Patented Sept. 20, 1971

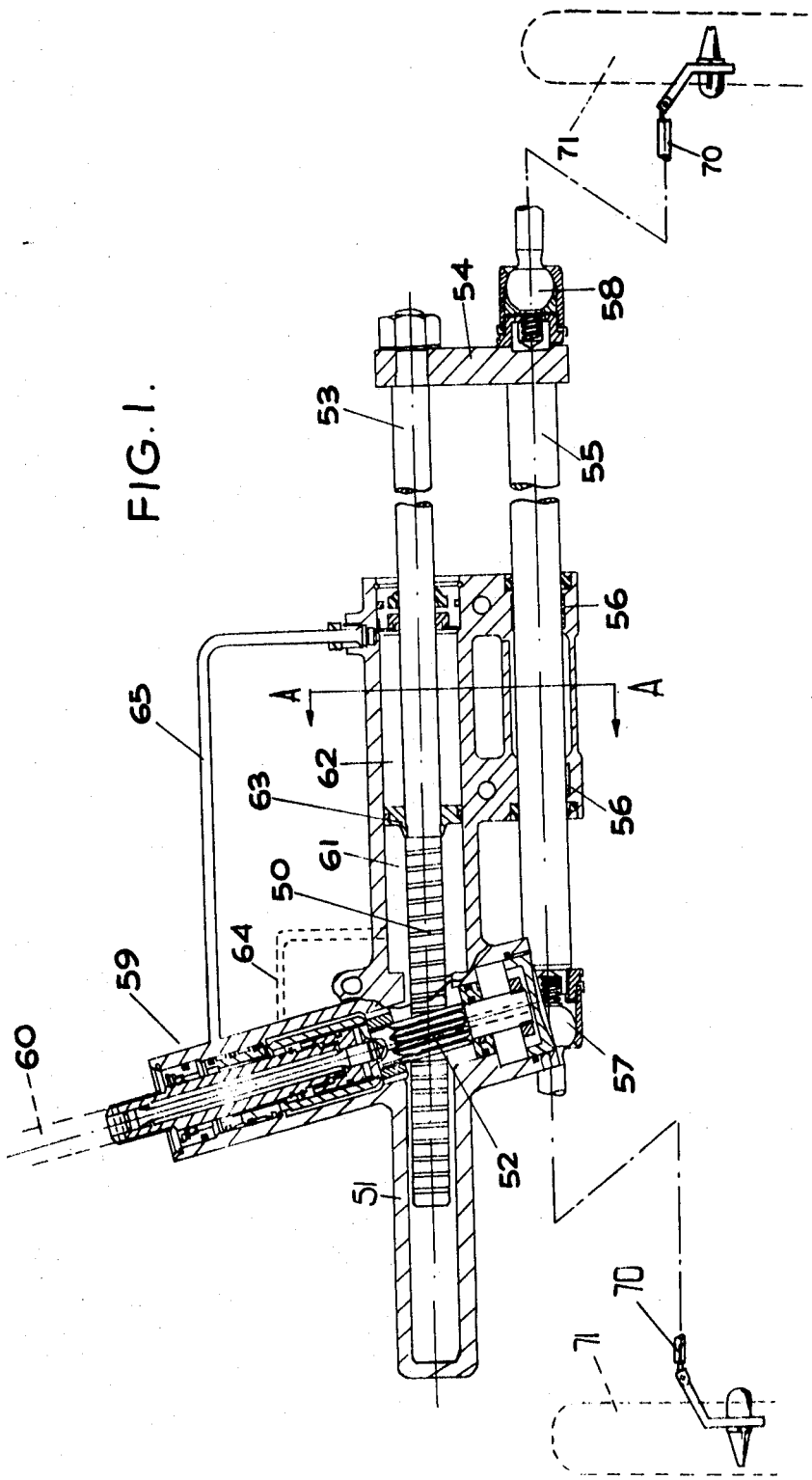

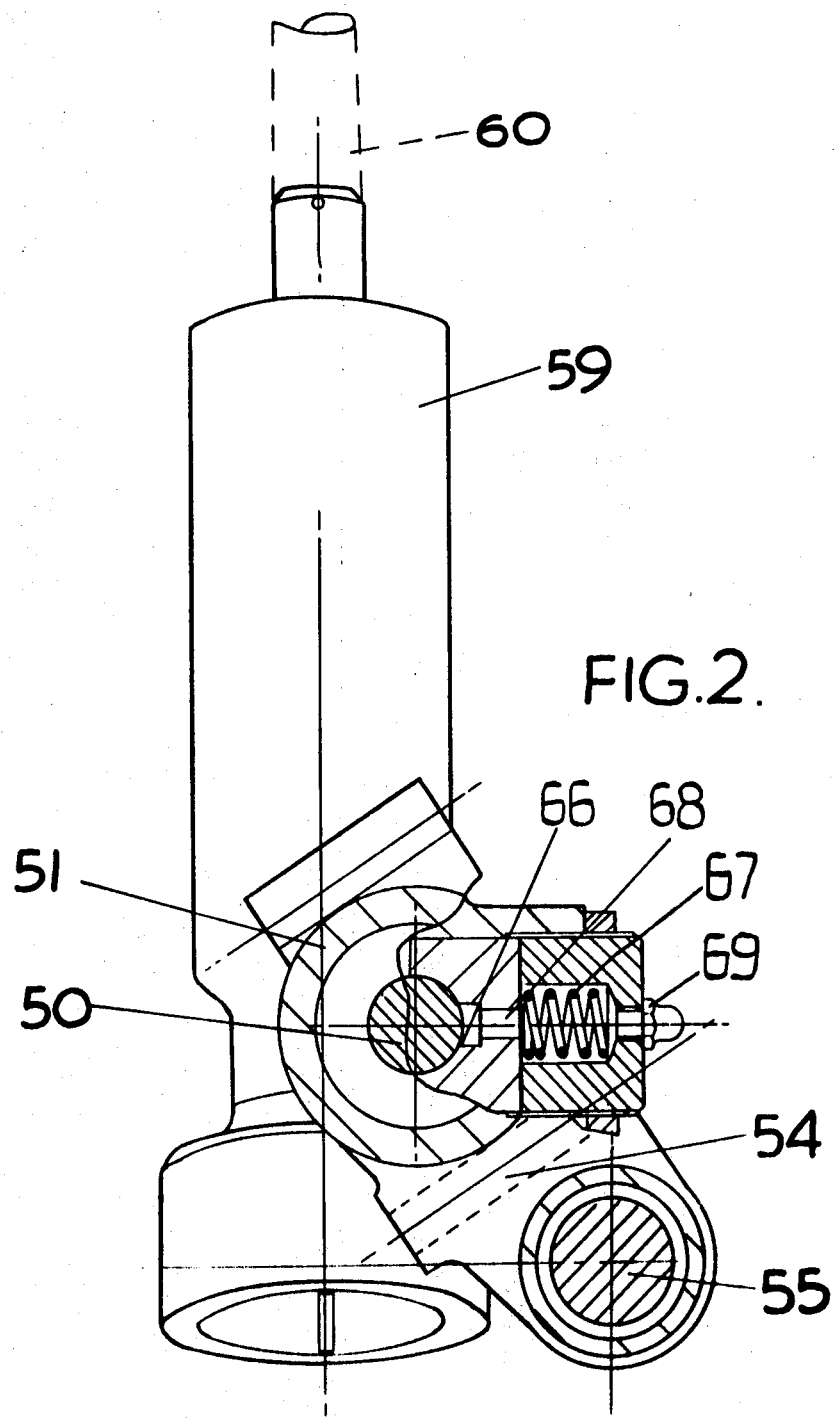

3,605,933
STEERING MECHANISM FOR MOTOR VEHICLES
Barry John Millard, Earley, near Reading, England, assignor to Adwest Engineering Limited
Filed June 30, 1969, Ser. No. 837,856
Claims priority, application Great Britain, July 1, 1968, 31,345/68
Int. Cl. B62d 3/12, 5/06
U.S. Cl. 180—79.2R                  4 Claims

ABSTRACT OF THE DISCLOSURE

A steering mechanism for a motor vehicle comprising a toothed rack slidable in a housing and having one end thereof projecting from the housing, a pinion in meshing engagement with the rack and rotatable to move the rack, and a rod mounted parallel with the rack and secured to the said one end of the rack so as to move therewith, at least one end of the rod being adapted for connection to the steerable road wheels of a motor vehicle.

---

This invention relates to motor vehicle steering mechanism and more particularly to rack and pinion steering mechanism. The invention is applicable to both manually operated steering mechanism and to power assisted steering mechanism.

In a known construction of rack and pinion steering mechanism, the rack is slidable in a casing by rotation of the pinion, the ends of the rack projecting from the casing and being connected to joints, e.g. ball joints, which form part of a steering linkage to the steerable road wheels. The distance between the two joints at the ends of the rack is determined by: the amount the rack is designed to be moved by the pinion in each longitudinal direction; the fact that no toothed part of the rack can be allowed to pass through an end of the casing; and, in the case where the cylinder incorporates a power piston for power assistance of the rack, by the fact that no toothed part of the rack can be allowed to pass through any seal incorporated in the cylinder in order to contain the hydraulic servo fluid. The result is that the two joints cannot be positioned closer to one another than a certain distance dictated by these factors.

The present invention is concerned with the provision of a rack and pinion steering mechanism, power assisted or manual, which will allow the distance between these joints to be reduced and thus give greater freedom in the design of the associated steering linkage and also in packaging and fitting the steering mechanism within particular vehicles.

According to the present invention there is provided a motor vehicle steering mechanism comprising a toothed rack 50 slidably mounted within a casing 51 and adapted to be connected with the steerable road wheels and a pinion 52 engaged with the toothed rack and adapted to be connected to a steering wheel or the like characterised in that an elongate member 55 is disposed parallel to the toothed rack 50 and there is a connection 54 between the toothed rack and the elongate member so that rotation of the pinion 52 causes the rack and the elongate member to move in unison, and either the rack or the elongate member is adapted to carry a joint 57, 58 at one or both ends which is adapted to be connected with the steerable road wheels.

In order that the invention may be more clearly understood one specific constructional example thereof will now be described with reference to the accompanying drawings, in which:

FIG. 1 is a sectional elevational view of the principal parts of the mechanism, and FIG. 2 is a cross-sectional view on the line A—A of FIG. 1.

A toothed rack 50 is mounted and slidable in a casing 51 by rotation of a pinion 52 in mesh with the rack 50. Only one end 53 of the rack projects from the casing 51 and is connected by a member 54 to a rod 55.

The rod 55 is slidable in bearings 56 carried by the casing 51 and has mounted at its ends ball-joints 57 and 58 for connection to steerable road wheels 71 through links 70.

In this embodiment the rack 50 is power assisted, but the invention is also applicable to manually operable racks.

Thus, a control valve 59 is interposed between the pinion 52 and the end of the steering column 60. The valve is of the kind disclosed and claimed in British Pat. No. 958,558 but other valves could be used including that described and claimed in British Pat. No. 818,483.

The valve 59 is supplied with hydraulic servo fluid under pressure, as known per se, from an engine driven pump (not shown) to one of two chambers 61 or 62 formed in the casing 51 by a piston 63 carried by the rack 50, through pipes 64 and 65 respectively to either urge the rack 50 to the right or to the left, as viewed in FIG. 1.

In operation, rotation of the steering column 60 clockwise causes movement of the rack 50, and rod 55, to the right, as viewed in FIG. 1. Simultaneously, the clockwise movement of the steering column causes a rotor within the valve 59 to open communication of the chamber 61 and pressurise the latter thus also urging the rack to the right. Similarly anti-clockwise rotation causes pressurisation of the chamber 62 and leftward movement of the rack. In the event of failure of the servo assistance, the rack will be moved solely by the mechanical connection through the pinion 52.

As can be seen in FIG. 1, the distance between the inner ball-joints 57 and 58 is dictated solely by the length of the rod 55 and not by the features of the rack 50 or its associated power cylinder, casing 51. Thus the distance between ball-joints 57 and 58 can be made much less than in known rack and pinion steering mechanism.

The rack 50 is urged into engagement with the pinion 52 by a pressure pad 66 (FIG. 2) which in turn is subjected to the pressure of a compression spring 67 through a seating 68, the spring 67 being contained by a threaded plug 69.

The pad 66 has a cylindrical surface in contact with a similar cylindrical section edge surface of the rack 50 (FIG. 2).

The mechanism illustrated is designed to fit across a vehicle, on a beam axle for instance, with the pinion parallel with or inclined to the vehicle longitudinal axis. However, the unit may be mounted longitudinally of the vehicle, not necessarily parallel to the longitudinal axis of the vehicle, in which case there would only be one inner ball-joint.

What I claim is:

1. Steering mechanism for a motor vehicle, the mechanism comprising a housing, a toothed rack mounted for longitudinal movement in said housing, one end of the toothed rack being enclosed within the housing and the other end of the toothed rack projecting through an end wall of the housing, a pinion engaging the rack, the pinion being rotatable to impart longitudinal movement to the rack and being adapted for connection to the steering control of a motor vehicle, an elongate member arranged parallel with the rack, at least one end of the elongate member being adapted for connection to the steerable road wheels of a motor vehicle, and means securing the elongate member to the projecting end of the toothed rack for constraining the elongate member to move longitudinally with the toothed rack, and including bearings fixed with respect to said housing and slidably supporting said elongate member in its movement longitudinally with respect to the toothed rack.

2. Steering mechanism according to claim 1, said bearings carried by said housing.

3. Steering mechanism according to claim 1, further comprising a piston carried by said toothed rack and slidable within a cylinder defined by said housing, and means for supplying power fluid to either side of said piston to provide power-assistance in moving the toothed rack.

4. Steering mechanism according to claim 3, wherein the means for supplying power fluid comprises a rotary control valve associated with the pinion and adapted to supply power fluid to the appropriate side of the piston dependent upon the direction of rotation of the pinion.

References Cited

UNITED STATES PATENTS

| | | | |
|---|---|---|---|
| 2,867,284 | 1/1959 | Hruska | 180—79.2 |
| 2,978,057 | 4/1961 | Barton et al. | 180—79.2 |
| 3,084,566 | 4/1963 | Pistillo | 180—79.2X |
| 3,163,093 | 12/1964 | Gut | 92—166X |

FOREIGN PATENTS

| | | | |
|---|---|---|---|
| 1,188,784 | 3/1959 | France | 180—79.2 |
| 783,467 | 9/1957 | Great Britain | 180—79.2 |
| 818,483 | 8/1959 | Great Britain | 180—79.2 |

BENJAMIN HERSH, Primary Examiner

L. J. PAPERNER, Assistant Examiner

U.S. Cl. X.R.

92—165R; 280—96